United States Patent
Wakamatsu

(10) Patent No.: US 7,697,464 B2
(45) Date of Patent: Apr. 13, 2010

(54) WIRELESS TERMINAL MANAGEMENT METHOD, BASE STATION AND WIRELESS TERMINAL MANAGEMENT PROGRAM

(75) Inventor: Masataka Wakamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1360 days.

(21) Appl. No.: 10/876,482

(22) Filed: Jun. 28, 2004

(65) Prior Publication Data

US 2005/0025081 A1 Feb. 3, 2005

(30) Foreign Application Priority Data

Jun. 30, 2003 (JP) ............... 2003-188422

(51) Int. Cl.
*G08C 17/00* (2006.01)

(52) U.S. Cl. ............... 370/311; 370/338; 370/443; 370/445

(58) Field of Classification Search ........... 370/338, 370/337, 326, 311, 445, 443
See application file for complete search history.

(56) References Cited

U.S. PATENT DOCUMENTS

| | | | | |
|---|---|---|---|---|
| 5,481,259 | A | * | 1/1996 | Bane ............... 340/870.03 |
| 6,101,173 | A | * | 8/2000 | Bayley ............... 370/311 |
| 6,622,251 | B1 | | 9/2003 | Lindskog et al. |
| 2004/0190467 | A1 | * | 9/2004 | Liu et al. ............... 370/311 |
| 2004/0264397 | A1 | * | 12/2004 | Benveniste ............... 370/311 |

FOREIGN PATENT DOCUMENTS

| | | |
|---|---|---|
| JP | 09-162798 | 6/1997 |
| JP | 10-135893 | 5/1998 |
| JP | 2001-007818 | 1/2001 |
| JP | 2002-541731 | 12/2002 |
| JP | 2003-179539 | 6/2003 |

OTHER PUBLICATIONS

Keith Amann, "Automatic Power Save Delivery Mechanism for QoS", IEEE 802.11-02/562r2, Wireless LANs, Sep. 8, 2002, 6 Pages.

* cited by examiner

*Primary Examiner*—Vincent P Harper
*Assistant Examiner*—Dung Lam
(74) *Attorney, Agent, or Firm*—Oblon, Spivak, McClelland, Maier & Neustadt, L.L.P.

(57) ABSTRACT

In order to make it possible for almost all of wireless terminals to operate intermittently without generating any conflicts in communication, and thereby, to achieve lower power consumption and transmission/reception of data pertaining to a wireless terminal immediately after a return from its power save state with top priority, mobile stations other than a first mobile station may be put in their power save states, while a return timing from the power save state of each of the mobile stations is intentionally shifted by a base station so as not to overlap in time. In addition, the base station performs polling on a mobile station returned from its power save state is polled with top priority so that transmission/reception of data pertaining to the mobile station is carried out between the mobile station and the base station within a CFP.

14 Claims, 5 Drawing Sheets

WIRELESS TERMINAL MANAGEMENT METHOD, BASE STATION AND WIRELESS TERMINAL MANAGEMENT PROGRAM

CROSS REFERENCES TO RELATED APPLICATIONS

The present document is based on Japanese Priority Document JP 2003-188422, filed in the Japanese Patent Office on Jun. 30, 2003, the entire contents of which being incorporated herein by reference.

BACKGROUND OF THE INVENTION

1. Field of the Invention

The present invention relates to a wireless terminal management method in a base station constituting a wireless communication system of a CSMA system together with a wireless terminal group including a plurality of wireless terminals capable of operating intermittently, and more particularly to a wireless terminal management method and a base station, both enabling achievement of lowering of power consumption by enabling the intermittent operations of almost all of the wireless terminals, and further to a wireless terminal management program to be executed by the base station.

2. Description of Related Art

In a wireless LAN system of a carrier sense multiple access (CSMA) system represented by IEEE 802.11, a mobile station should always receive a transmission from a base station, and consequently the power consumption of the mobile station becomes large even if the mobile station does not perform any transmissions and receptions of data. Accordingly, also in IEEE 802.11 Standard, a power save mode is regulated. This is an intermittent operation such that a mobile station is put in a standby state (indicating the same meaning as that of a power save state), in which the mobile station cannot receive any beacon frames, for predetermined beacon frames, and that, after the mobile station is put in a state in which the mobile station can receive beacon frames (active state) owing to a return from the standby state, the mobile station performs transmissions and receptions of accumulated data up to that time, and further that the mobile station is put in the standby state again after that.

In that case, if the return period from the standby state is not shortened as much as possible, the effect of the intermittent operation is worn off. In IEEE 802.11 Standard, a method for making a terminal which has returned from the power save mode perform a transmission and a reception of data preferentially in accordance with a procedure called "PS-POLL" by means of a contention free period (CFP) is prepared.

Hereupon, a network composed of a base station, a normal mode mobile station and power save mode mobile stations is exemplified while a power saving operation according to prior art is described. FIG. 5 shows the operation of an example thereof. As shown in the drawing, beacons are generated and transmitted at a fixed period from a base station AP. Between a beacon and the next beacon, a contention free period CFP, which is defined immediately after the beacon in order that the base station AP can acquire wireless media preferentially and is assigned as a predetermined period, and a contention period CP (a fixed period) for performing a transmission and a reception of data by securing a right of access by the CSMA are provided.

Moreover, marks MT1 to MT4 and vertically long rectangular frame (displayed with oblique lines or without oblique lines), which are shown in the drawing, are described as follows:

MT1: a mobile station which is not put in any power save states;

MT2: a mobile station which is put in a power save state with an interval of four beacons (four beacon periods);

MT3: a mobile station which is put in a power save state with an interval of four beacons or more;

MT4: a mobile station which is put in a power save state with an interval of four beacons or more;

vertically long rectangular frame (displayed with oblique lines): access between the AP and an MT during a CFP for the base station AP to perform polling to the mobile stations MT1 to MT4 in the order of association ID (AID) for performing a transmission and a reception of data; and vertically long rectangular frame (displayed without any oblique lines): access between the AP and an MT during a CP during which a transmission and a reception of data is actually performed.

Incidentally, the "association" means the communication to be performed for transferring basic information pertaining to the communication such as functions corresponding to the respective base station AP and the mobile stations MT1 to MT4 and respectively necessary transmission bandwidths before actual data communication between each of them.

As shown in FIG. 5, polling in the CFP is performed in the order of the AID. Each of the mobile stations MT2 to MT4, which has returned from its power save state, is put in a beacon frame receivable state (an active state) until the mobile station itself is polled. Then, each of them is again put in its power save state after the end of a transmission and a reception of data during the CP, or is again put in the power save state just behind the polling during the CFP in a case where no transmissions and receptions of data are necessary. Incidentally, in the present example, the order of transmissions and receptions of data in a CP is not always performed in the order of the AID, but the order is determined on all such occasions according to random numbers generated in each of the mobile stations MT1 to MT4.

Generally, in IEEE 802.11 Standard, CFPollable mobile stations (indicating terminals corresponding to polling operations in a CFP, which are options of the standard) are being polled in the order of the AID. Consequently, there is a case where a mobile station which has returned from its power save state is waiting its turn until the mobile station itself is polled. Moreover, when a return timing from a power save mode overlaps in time with a specific beacon frame, the transmission and the reception of the data accumulated during the CFP have not been completed, and the right of access is successively secured in the CSMA to perform a transmission and a reception of the data.

For information, the power save mode in the infrastructure base service set (BSS) mode of the IEEE 802.11 would be described as follows:

1) A mobile station notifies a base station how many times of beacons the mobile station is put in its power save state at the time of an association;

2) The mobile station wakes up in order to be able to receive a prearranged beacon, and confirms whether any data to be received exists in the base station or not;

3) The base station displays that the base station is buffering the data addressed to the mobile station, which is in power saving, in a part of a delivery traffic indication map (DTIM: the information concerning the beacon frame at which a multicast frame transmission from an access point is performed);

4) The mobile station, which has returned, confirms a traffic indication map (TIM). Then, when any data exists, the mobile station receives the data in accordance with the PS-POLL;

5) The mobile station confirms the DTIM. Then, the mobile station also wakes up by the beacon by which a multicast by the base station is performed; and 6) The mobile station transmits a frame of a power saving start to the base station, and returns to its standby state at the point of time when the mobile station receives an acknowledgement (Ack) from the base station.

Incidentally, Patent Document 1 discloses a method for performing the transmission of data addressed to a mobile station operating intermittently at the timing when the mobile station returns preferentially to the transmissions and the receptions of data addressed to the other mobile stations operating normally, though the method has no compatibility with the system of IEEE 802.11 Standard, which has begun to be spread as a system of a wireless LAN. Moreover, Patent Document 1 also discloses a method for making an interval of beacons variable according to the data amount of a mobile station operating intermittently, and a method for changing the timing for returning to a standby state. On the other hand, Patent Document 2 also discloses an intermittent operation as a technique for differentiating a check period of base station's checking.

[Patent Document 1] Japanese Patent Application Publication (KOKAI) No. Hei 9-162798

[Patent Document 2] Japanese Patent Application Publication (KOKAI) No. 2003-110582

SUMMARY OF THE INVENTION

However, the intermittent operations supposed so far are related to cases where about one or two mobile stations at the most among the mobile stations belonging to the network of a certain base station operate intermittently. Consequently, when almost all of the mobile stations operate intermittently for achieving lower power consumption, a new defect is produced. The reason is that, for example, when it is supposed that a plurality of mobile stations returns from power save states concurrently, conflicts are generated in communication with the base station. As a result, return periods become longer, and then increases of power consumption are brought about contrarily.

In view of this conventional problem, the present invention provides a wireless terminal management method and a base station, both having the following features, and further a wireless terminal management program to be executed in the base station. For being able to coexist with existing systems, the wireless terminal management method and the base station have upward compatibility with the system of IEEE 802.11 Standard, and make it possible for almost all of wireless terminals to operate intermittently while the quality of service (QoS: in a transmission bandwidth and a transit delay) necessary for a transmission of streaming data or the like is secured without generating any conflicts in communication. Thereby, the wireless terminal management method and the base station can achieve to make power consumption be lowered, and can perform the transmission and the reception of the data pertaining to a wireless terminal just behind a return from its power save state by the top priority.

A wireless terminal management method according to the present invention includes: a step for collecting power saving periods as periods each for n beacons (where n is generally an integer of two or more), the power saving periods notified from each of wireless terminals capable of operating intermittently at a time of an association; a step for adjusting start timing of power saving of each of the wireless terminals capable of operating intermittently on the collected power saving periods in order that a return timing from power save states is not overlapped in time with each other as much as possible; a step for transferring wireless terminals reaching the start timing of power saving to the power save states in accordance with the adjusted start timing of power saving; and a step for performing a transmission and a reception of data with top priority with a wireless terminal at every automatic return thereof from a power save state to transfer the wireless terminal to the power save state, whereby each of the wireless terminals capable of operating intermittently is managed.

As described above, the start timing of power saving of each of the wireless terminals capable of operating intermittently is adjusted in order that the return timing from the power save states may not overlap in time with each other for performing their intermittent operations. Consequently, the intermittent operations of almost all of the wireless terminals are enabled without any conflicts in communication, and thereby the lowering of power consumption can be achieved. Moreover, as a result of polling by the top priority to a wireless terminal at every return thereof from a power save state, the data pertaining to the wireless terminal is transmitted and received by the top priority during a CFP, and the wireless terminals are rapidly returned to the power save states.

As described above, according to the present invention, the following wireless terminal management method and the base station are provided. That is, for being able to coexist with existing systems, the wireless terminal management method and the base station have upward compatibility with the system of IEEE 802.11 Standard, and make it possible for almost all of wireless terminals to operate intermittently while the QoS necessary for a transmission of streaming data or the like is secured without generating any conflicts in communication. Thereby, the wireless terminal management method and the base station can achieve to make power consumption be lowered, and can perform the transmission and the reception of the data pertaining to a wireless terminal immediately after a return from its power save state with top priority. Furthermore, a wireless terminal management program to be executed by the base station is provided.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

EMBODIMENTS OF THE INVENTION

In the following, an embodiment of the present invention will be described on FIGS. 1-4.

Figure 1:
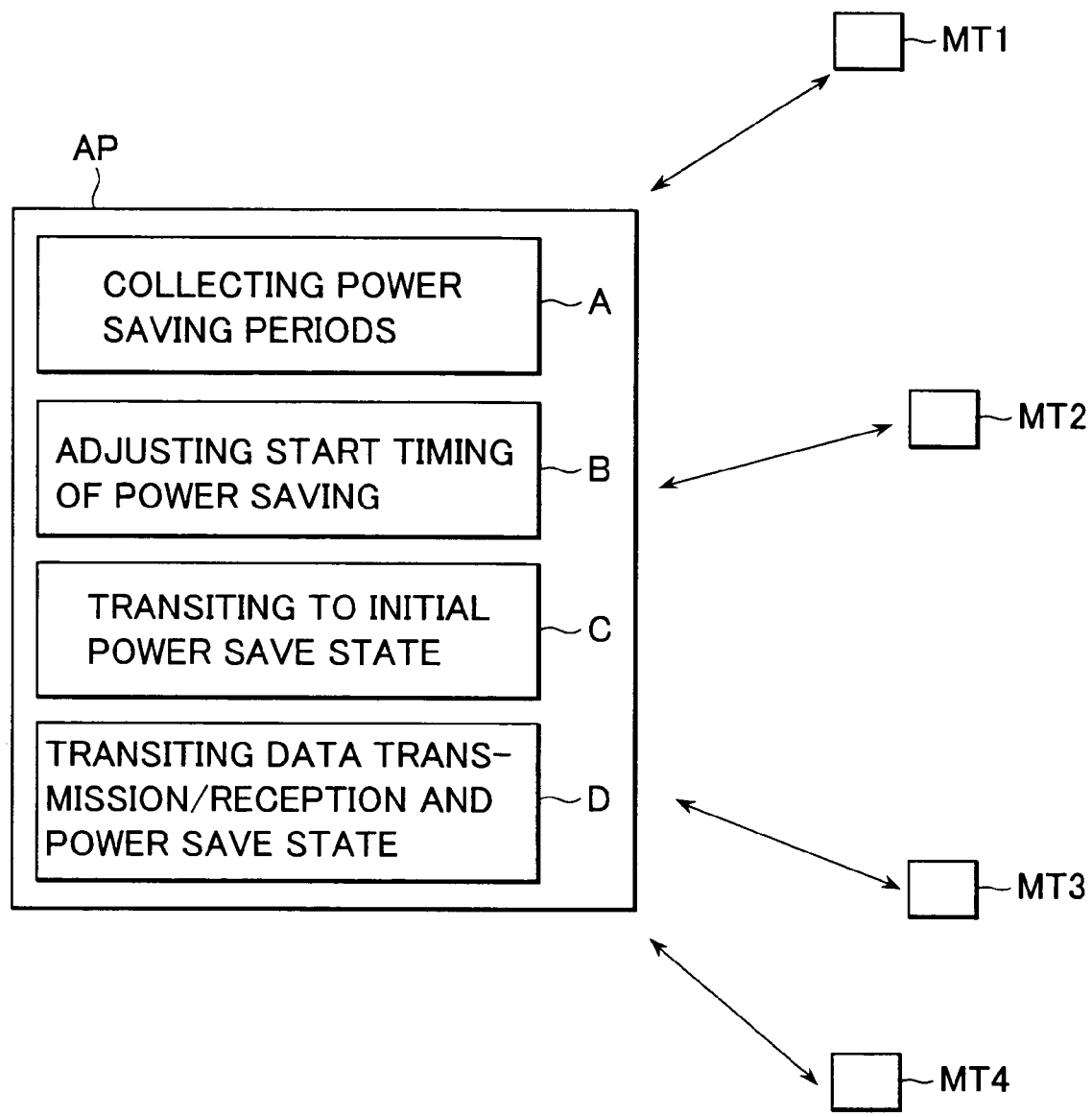
FIG. 1 is a view showing a network of an example of the present invention, which network is composed of a base station, a mobile station in a normal mode and mobile stations in their power save modes.
Figure 2:
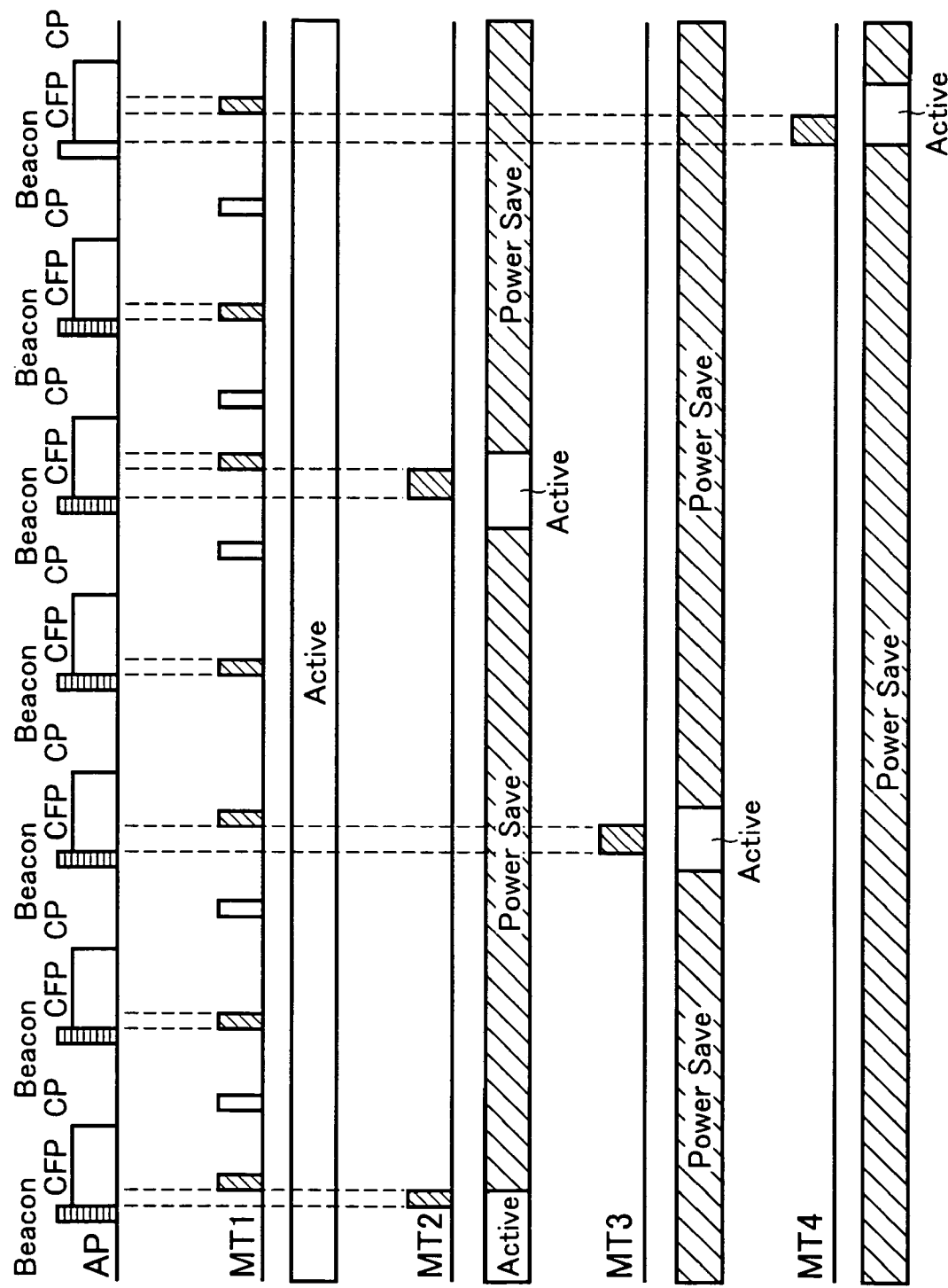
FIG. 2 is a view showing a power saving operation of the example of the present invention.
Figure 5:
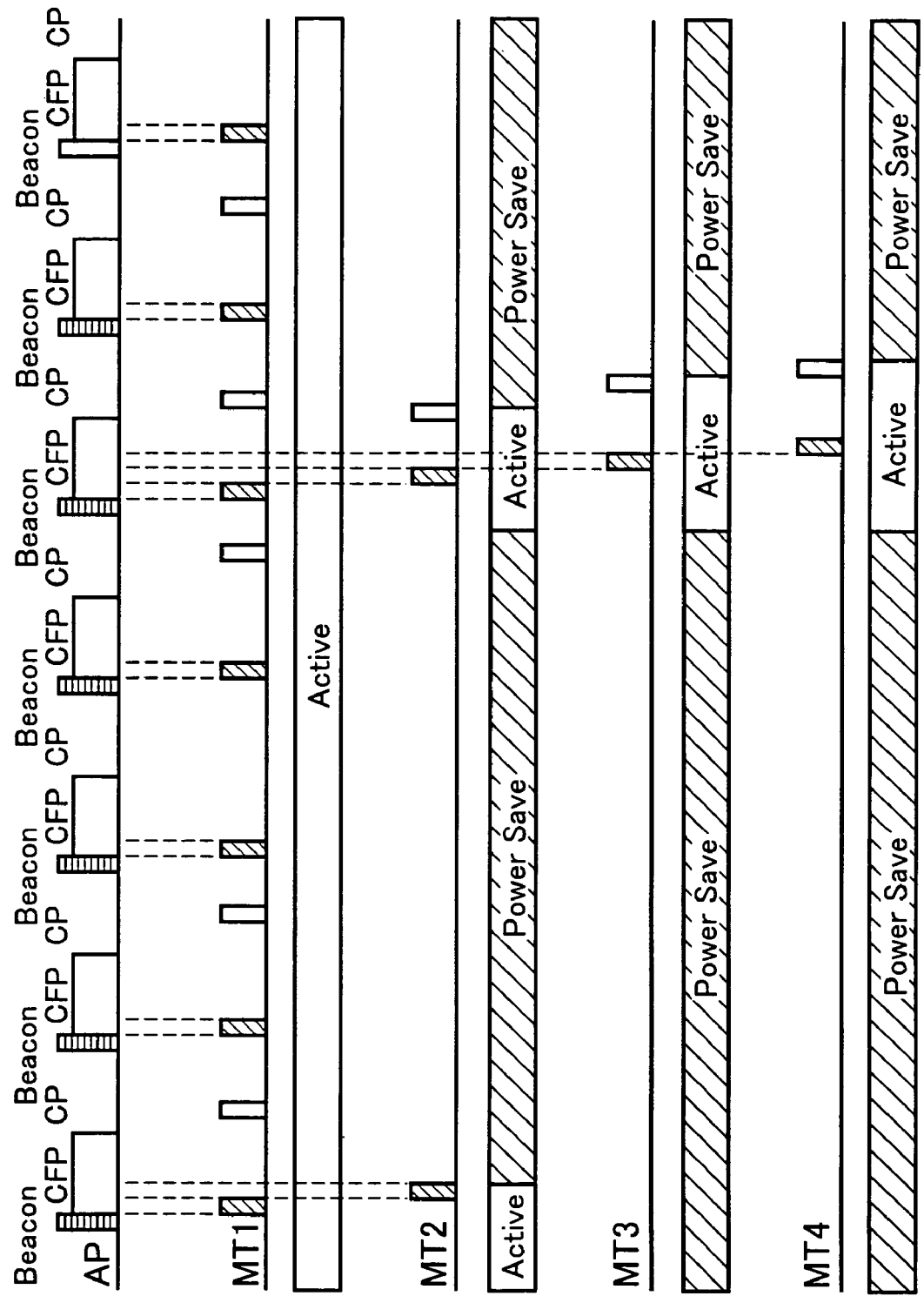
FIG. 5 is a view showing a power saving operation according to related art.

First, a network of an example according to the present invention is shown in FIG. 1, and a power saving operation of the example is shown in FIG. 2. As shown in the drawings, a network (for example, a wireless LAN) similar to a case of FIG. 5 mentioned previously is supposed, and beacons are generated from a base station AP at a fixed period. Between a beacon and a next beacon, a contention free period CFP, which is defined just behind the beacon in order that the base station AP can acquire wireless media preferentially and is assigned as a predetermined period, and a contention period CP (a fixed period) for performing a transmission and a reception of data by securing the right of access by the CSMA are provided.

Moreover, marks MT1 to MT4 and vertically long rectangular frame (displayed with oblique lines or without oblique lines), which are shown in FIGS. 1 and 2, are described as follows:

MT1: a mobile station which is not put in any power save states;

MT2: a mobile station which is put in a power save state with an interval of four beacons (four beacon periods);

MT3: a mobile station which is put in a power save state with an interval of four beacons or more;

MT4: a mobile station which is put in a power save state with an interval of four beacons or more;

vertically long rectangular frame (displayed with oblique lines): access between the AP and an MT during a CFP for the base station AP to perform polling to a mobile station (any one of the mobile stations MT1 to MT4) just behind a return from a power save state by the top priority at first to perform a transmission and a reception of data in the CFP, and to perform polling to a residual mobile station (MT1) in an active state after that for performing a transmission and a reception of data during a CP; and vertically long rectangular frame (displayed without any oblique lines): access between the AP and an MT during a CP during which a transmission and a reception of data of the mobile station (MT1) which is not put in any power save states is performed.

As apparent from FIG. 2 mentioned above, the mobile stations MT2 to MT4 other than the mobile station MT1 are enabled to be put in their power save states. However, differently from the power saving operations shown in FIG. 5, the return timing of each of the mobile stations MT2 to MT4 from the power save states are intentionally shifted from each other by the base station AP in order not to overlap in time with each other. Moreover, to a mobile station which has returned from a power save state, polling is performed from the base station AP with top priority. Thereby, the transmission and the reception of the data pertaining to the mobile station are performed during a CFP.

To describe it more minutely, because the mobile station MT1 is always put in its active state, the mobile station MT1 is polled from the base station AP at every beacon period with top priority when all of the mobile stations MT2 to MT4 are in their power save states. When there is the data addressed to the mobile station MT1 in the base station AP, or when there is the data addressed to the base station AP in the mobile station MT1, at that time, the data is transmitted and received during the CP.

Now, in such a state, for example, in a case where it is supposed that the mobile station MT2 returns from its power save state, first the mobile station MT2 is preferentially polled differently from the situation up to that time. At that time, in a case where there is no data addressed to the mobile station MT2 in the base station AP, or where there is no data addressed to the base station AP in the mobile station MT2, the mobile station MT2 is immediately put in the power save state again. However, in a case where there is the data mentioned above, the data is transmitted and received during the CFP, and the mobile station MT2 is again put in the power save state. On the other hand, the polling to the mobile station MT1 is performed at the same time as that when the mobile station MT2 is put in the power save state. Then, at that time, if there is the data addressed to the mobile station MT1 in the base station AP, or if there is the data addressed to the base station AP in the mobile station MT1, then the data is transmitted and received during the CP. Such a relation between the mobile stations MT1 and MT2 can be similarly applied to the relations between the mobile station MT1 and each of the mobile stations MT3 and MT4. Incidentally, a transfer of each of the mobile stations MT2 to MT4 to a power save state is not performed until permission from the base station AP is received. In a case where the transfer is not permitted, a frame change of a power save start is performed again at a next beacon frame.

Now, a method for shifting the return timing of each of the mobile stations MT2 to MT4 from a power save state is described as follows. Before the shifting, a power saving period which is notified from each of the mobile stations MT2 to MT4 as a period for n beacons (where n is generally an integer of two or more) at the time of association is collected by the base station AP. The power saving period mentioned hereupon is defined as a period to be determined by each of the mobile stations MT2 to MT4 on a transmission. bandwidth and a transmission delay, both required by an application program, and a beacon period and a rough data transmission quantity per the beacon period, both set by the base station AP.

On the power saving periods collected as above, the base station AP adjusts the start timing of power saving of each of the mobile stations MT2 to MT4 in order that the return timing from the power save states do not overlap in time with each other as much as possible. As the method for shifting the return timing, a method for changing a power saving period by making the power saving period variable, and a method for shifting start timing to a power save state while leaving the power saving period as it is can be considered.

In a case of the former method, the method has flexibility as a timing adjustment, but a negotiation concerning re-association and the like becomes necessary between the base station AP and each of the mobile stations MT2 to MT4 at every change of a power saving period. On the other hand, in a case of the latter method, especially in a case where each of the mobile stations MT2 to MT4 operates with the same power saving period, a first setting of the power saving period in order not to make a return timing overlap with each other would makes the timing adjustment after that unnecessary.

As described above, the power saving period of each of the mobile stations MT2 to MT4 is determined. At the time of the determination, a method for determining a power saving period selectively among a plurality of kinds of power saving periods which has been prepared in advance may be adopted. Moreover, as a developed shape, a method for selecting a power saving period only from limited periods composed of a basic period as a period for n beacons and m-fold periods (where m is an integer of two or more) of the basic period as the plurality of kinds of the power saving periods may be adopted. By the method, not only the similar shifting of the return timing is enabled, but also the securing of the degree of freedom of the setting of the power saving period is enabled.

As a development shape, for example, in a case where the basic period is set as an 8-beacon period and the basic period and a 16-beacon period (=2×basic period) are set to the mobile stations MT2 and MT3, respectively, the mobile station MT2 is set to return at the first beacon, and the mobile station MT3 is set to return at the second beacon. In the case of such a setting, the return timing of the mobile station MT2 is at the 1st, the 9th, the 17th, the 25th, the 33rd, the 41st, the 49th, the 57th, the 65th, . . . beacon, and the return timing of the mobile station MT3 is the 2nd, the 18th, the 34th, the 50th, the 66th, . . . beacon. Consequently, the overlap of the return timing can be evaded. It is possible not to make the return timing overlap with each other by the number of the basic periods.

Moreover, it is preferable that the start timing of power saving of each wireless terminal capable of operating intermittently is adjusted in order that there is an interval longer than at least two beacon periods between mutual generation of each return timing at the time of the adjustment of the start timing of power saving. This is why, if re-transmission process of data is produced, or if un-transmitted data exists at the time of a transmission and a reception of the data of a mobile station which has returned from a power save state, then it becomes necessary to extend the return period up to the next beacon frame for making the re-transmission or the transmission and the reception of the un-transmitted data be performed rapidly and smoothly. Incidentally, the extension of the return period does not change the power saving period of the mobile station.

Now, it is preferable to generate each return timing with an interval longer than at least two beacon periods as described above. However, in a case where there are a lot of mobile stations capable of operating intermittently, there may be a case where beacon frames to which a return timing is not assigned yet do not exist within a predetermined number of beacon frames can be also considered. In such a case, the start timing of power saving may be adjusted in order that the return timing to a newly entered terminal capable of operating intermittently may be assigned at a beacon frame at which the number of overlaps of return timings is smallest. Consequently, in the example shown in FIG. 1, for example, in a case where the return timing of the mobile stations MT2 and MT3 overlaps with each others the mobile stations MT2 and MT3 are polled first in the order of the AID, and then the mobile station MT1 is polled.

Figure 3:
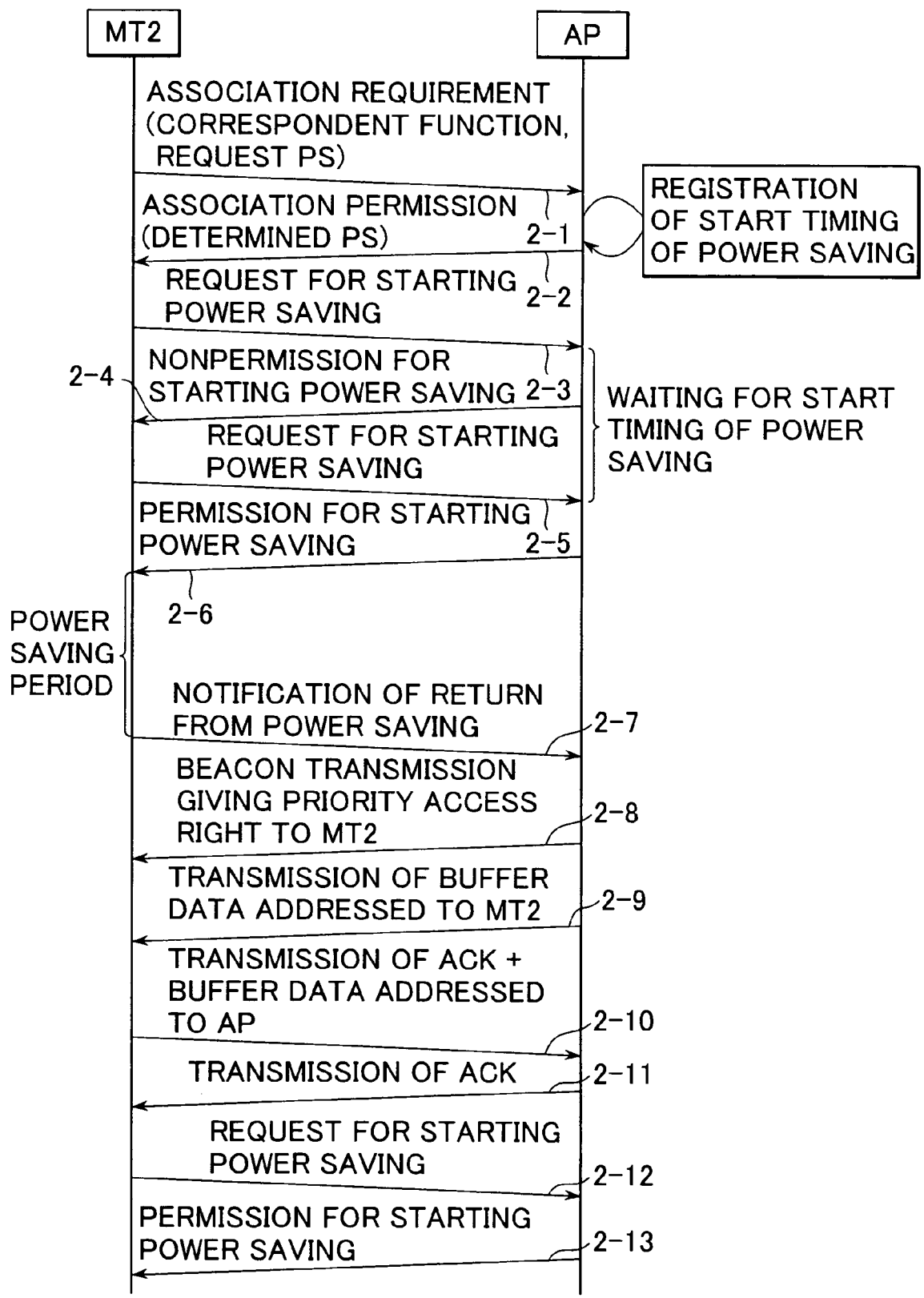
FIG. 3 is a view showing an operating sequence between a base station and a mobile station capable of operating intermittently.

The wireless terminal management method of the present invention is as above. Hereupon, an operating sequence of, for example, an example between the base station AP and the mobile station MT2 is described as shown in FIG. 3. In this case, before actual data communication between the base station AP and the mobile station MT2, association is first performed by a request from the mobile station MT2 (process 2-1). In the association, basic information pertaining to the communication such as a corresponding function and a necessary transmission bandwidth is notified to the base station AP by the mobile station MT2. At that time, a power saving period PS determined by the mobile station MT2 is also notified. In the base station AP, the start timing of power saving of the mobile station MT2 and the other mobile stations is adjusted on the power saving period PS of the mobile station MT2 and a power saving period of each of the other mobile stations, and the adjusted start timing of power saving is registered. At the time of the adjustment, the power saving periods of the mobile station MT2 and the other mobile stations are changed as the need arises, and the start timing of power saving is adjusted.

After that, the power saving period PS from the mobile station MT2 is notified to the mobile station MT2 as it is or as a changed power saving period as a determined power saving period (process 2-2). After the point of time, a process for waiting a start timing of power saving is performed. In the waiting process, a process in which non-permission for starting power saving is sent back from the base station AP to the mobile station MT2 at every sending of a request for starting power saving from the mobile station MT2 to the base station AP is repeated over several times (processes 2-3 and 2-4). Shortly, when a permission for starting power saving is sent back as a response to a request for starting power saving sent at a certain point of time, the mobile station MT2 is first put in a power save state (processes 2-5 and 2-6). After this, the mobile station AP is kept in the power save state during the power saving period determined by the base station AP.

Shortly, at the time of the end of the power saving period, the mobile station AP automatically returns from the power save state, and the return is notified to the base station AP (process 2-7). After that, a beacon is transmitted from the base station AP (process 2-8). The beacon can be received by, of course, the mobile station MT2, and further by the other mobile stations which are in an active state. By the polling to the mobile station MT2 after the reception of the beacon, the data pertinent to the mobile station MT2 is first transmitted and received with top priority. When there is the data addressed to the mobile station MT2 in the base station AP as shown in the drawing, first the data is transmitted to the mobile station MT2 (process 2-9). Successively, when there is the data addressed to the base station AP in the mobile station MT2, the data is transmitted to the base station AP together with an ACK indicating a reception confirmation of the data from the base station AP (process 2-10). To the transmission, an ACK indicating a reception confirmation of the data from the mobile station MT2 is sent back from the base station AP to the mobile station MT2 (process 2-11). After that, a request for staring power saving is sent from the mobile station MT2 to the base station AP for being put in a power save state. The mobile station MT2 is not put into the power save state again until a permission for starting power saving is sent from the base station AP as a response to the request for starting power saving (processes 2-12 and 2-13).

Now, the configuration of the base station AP is described. The outline of the configuration is shown in FIG. 1. For the implementation of the method of the present invention, as the constituent elements, at least means A for collecting power saving periods as periods each for n beacons (where n is generally an integer of two or more), the power saving periods notified from each of wireless terminals capable of operating intermittently at a time of association; means B for adjusting a start timing of power saving of each of the wireless terminals capable of operating intermittently on the collected power saving periods in order that a return timing from power save states is not overlapped in time with each other as much as possible; means C for transferring wireless terminals reaching the start timing of power saving to the power save states in accordance with the adjusted start timing of power saving; and means D for performing a transmission and a reception of data with top priority with a wireless terminal at every automatic return thereof from a power save state to transfer the wireless terminal to the power save state.

Among the constituent elements, the means B adjusts the start timing of power saving of each of the wireless terminals capable of operating intermittently in order that each of the return timing is generated with an interval longer than at least two beacon periods between mutual return timing at the time of the adjustment of the start timing of power saving. Moreover, in a case where there are no beacon frames which do not overlap with the other return timing within a predetermined number of continuous beacon frames at the time of the performance of the adjustment of the start timing of power saving to a newly entered terminal capable of operating intermittently, the start timing of power saving is adjusted in order that a beacon frame at which the number of overlaps of the return timing is smallest may be the return timing.

Figure 4:
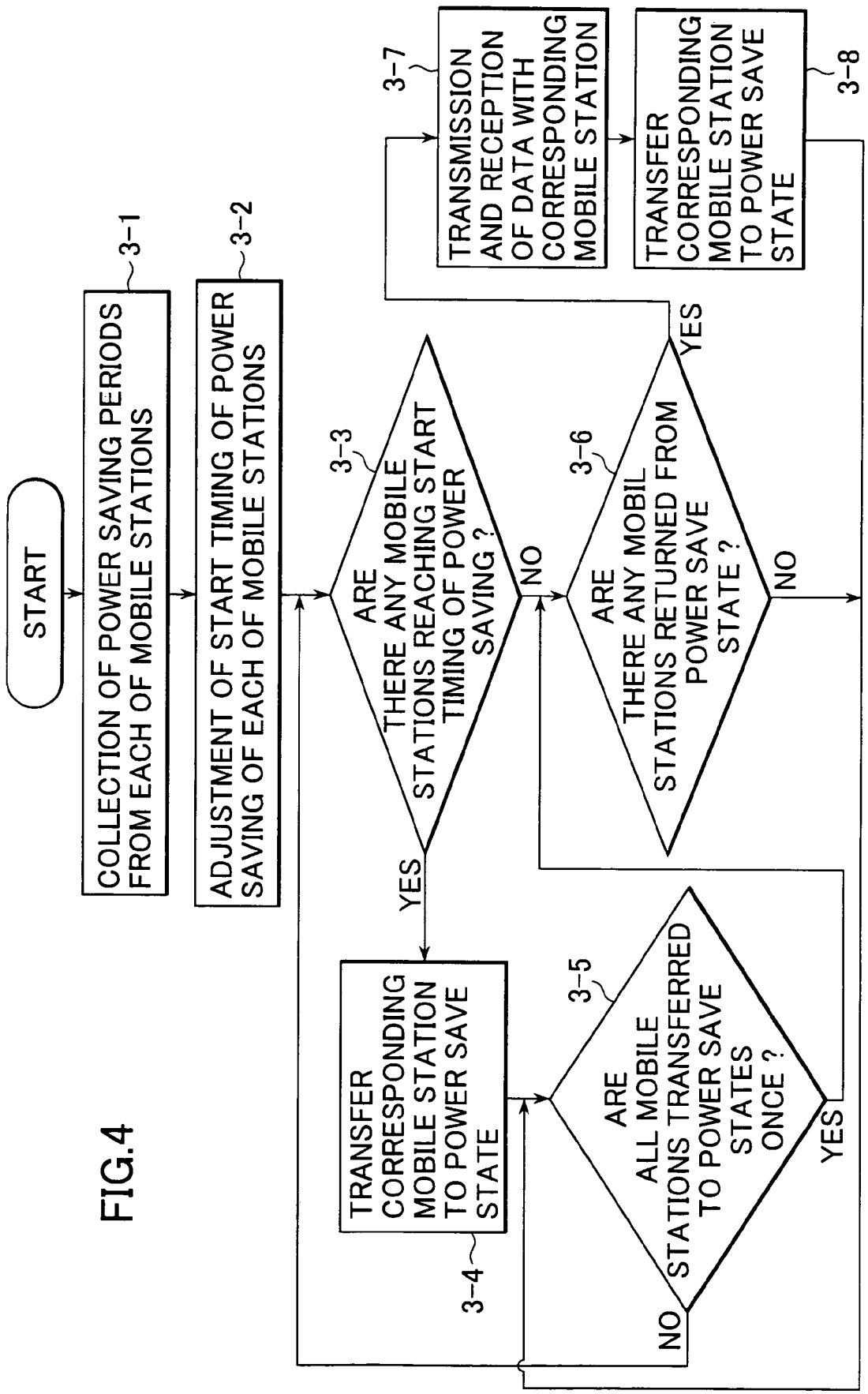
FIG. 4 is a view showing a wireless terminal management program of an example to be executed by the base station.

Moreover, a wireless terminal management program (incidentally, only the mobile stations as the wireless terminals to be put in power save states are focused) of the present invention to be executed by the base station AP is described. The outline of the process flow of an example of the wireless terminal management program is shown in FIG. 4. As shown in the drawing, at the time of an association, first, each of the wireless terminals capable of operating intermittently notifies the base station of a power saving period as a period for n beacons (n is generally an integer of two or more). Thereby, the base station collects the power saving periods (process 3-1). Next, the base station adjusts the start timing of power saving of each of the wireless terminals capable of operating intermittently on the collected power saving periods in order that the return timing from the power save states may not overlap in time with each other as much as possible (process 3-2).

After that, the existence of a mobile station reaching the start timing of power saving is judged in accordance with the start timing of power saving. As to the mobile station judged to exist, the mobile station is transferred to the power save state, and it is judged whether or not all of the mobile stations are transferred to the power save states once (processes 3-3 to 3-5). At this judgment, if not all of the mobile stations have transferred to the power save states once yet, the existence of the mobile station reaching the start timing of power saving is judged again (processes 3-5 and 3-3). Moreover, in a case where there are no mobile stations reaching the start timing of power saving in the judgment of the existence of the mobile station reaching the start timing of power saving, or where all of the mobile stations are judged to be transferred to the power save states once at the judgment of whether all of the mobile stations have been transferred to the power save states once or not, the existence of the mobile station which has automatically returned from the power save state is judged (processes 3-3, 3-6, 3-5 and 3-6).

In a case where no mobile stations have automatically returned at the judgment of the existence of the mobile stations which have automatically returned from the power save states, whether all of the mobile stations are transferred to the power save states once or not is judged (processes 3-6 and 3-5). Moreover, when there is a mobile station which has automatically returned at the judgment of the existence of the mobile stations which have automatically returned from the power save states, a transmission and a reception of data is performed with the mobile station, and the mobile station is transferred to the power save state. After that, whether all of the mobile stations have been transferred to the power save states once or not is judged (processes 3-6 to 3-8, and 3-5).

After all, the wireless terminal management program is controlled to include basically: a step for collecting power saving periods as periods each for n beacons (where n is generally an integer of two or more), the power saving periods notified from each of wireless terminals capable of operating intermittently at a time of an association, a step for adjusting a start timing of power saving of each of the wireless terminals capable of operating intermittently on the collected power saving periods in order that a return timing from power save states is not overlapped in time with each other as much as possible; a step for transferring wireless terminals reaching the start timing of power saving to initial power save states in accordance with the adjusted start timing of power saving; and a step for transiting data transmission/reception and power save state in which a transmission and a reception of data is performed with top priority with a wireless terminal at every automatic return of each of the wireless terminals from their power save states to transfer the wireless terminal to the power save state.

At the step for adjusting a start timing of power saving among these steps, the start timing of power saving of each of the wireless terminals capable of operating intermittently is adjusted in order that each of the return timing may be generated with an interval longer than at least two beacon periods between mutual return timing at the time of the adjustment of the start timing of power saving. Moreover, in a case where there is no beacon frames which do not overlap with any other return timing within a predetermined number of continuous beacon frames at the time of the performance of the adjustment of the start timing of power saving of a newly entered terminal capable of operating intermittently, the start timing of power saving is adjusted in order that a beacon frame at which the number of overlaps is smallest may be the return timing.

As it is known from the above descriptions, the following effects (1)-(4) can be obtained:

(1) When many mobile stations operate in their power save modes, a transmission and reception process of buffered data can be ended within a short time, and a period of a mobile station put in an active state is minimized. As a result, the lowering of power consumption is realized;

(2) The degree of freedom of setting a power saving interval is high;

(3) Because all of the buffering and the scheduling of data are performed by a base station, the load of a mobile station is light; and (4) Because the present invention can be implemented by means of a mounting method which is not regulated by a wireless LAN standard, the present invention can hold compatibility with existing equipment.

In the above, the invention made by the present inventor has been described concretely on an embodiment of the invention, but the present invention is not limited to the embodiment, and various changes can be made without departing from the subject matter of the invention. It is needless to say that the present invention can be applied not only to the IEEE 802.11 but also to the other wireless communication standards, portable telephone networks and the like.

What is claimed is:

1. A wireless terminal management method in a base station constituting a CSMA wireless communication system together with a wireless terminal group including a plurality of wireless terminals operable intermittently, said method comprising:

collecting requested power saving periods as periods each for n beacons (where n is generally an integer of two or more), the requested power saving periods notified from each of wireless terminals operable intermittently at a time of an association, the requested power saving periods selected from among n beacons and m×n beacons (where m is an integer two or more);

notifying the wireless terminals of a determined power saving period determined in the base station;

adjusting a start timing of power saving of each of the wireless terminals in order that a return timing from power save states is not overlapped in time with each other as much as possible in accordance with the determined power saving periods, the adjusting including adjusting the start timing such that there is an interval longer than at least two beacon periods between mutual generation of each return timing;

transiting, in accordance with the start timing of power saving adjusted at said adjusting a start timing of power saving, wireless terminals reaching the start timing of power saving to initial power save states; and transiting data transmission/reception and power save state in which transmission/reception of data is performed with top priority with a wireless terminal at every automatic return thereof from a power save state to transit the wireless terminal to the power save state.

2. The wireless terminal management method according to claim 1, wherein the requested power saving period collected at said collecting requested power saving periods is determined by each of the wireless terminals operable intermittently in accordance with a transmission bandwidth and transmission delay, both required by an application program, and a beacon period and a rough data transmission quantity per the beacon period, both set by the base station.

3. The wireless terminal management method according to claim 1, wherein transition to the power save state of the wireless terminal after the data transmission/reception on a top priority polling to the wireless terminal returned from the power save state at said transiting data transmission/reception and power save state is carried out after receiving permission from the base station.

4. The wireless terminal management method according to claim 3, wherein, in a beacon frame immediately after the power save state, in a case where re-transmission process of data is produced, or where un-transmitted data exists, a return period is extended and the re-transmission or the transmission/reception of the un-transmitted data is carried out in a next beacon frame.

5. The wireless terminal management method according to claim 1, wherein, upon adjusting the start timing of power saving on a newly entering wireless terminal operable intermittently at said adjusting a start timing of power saving, in a case where there is no beacon frame which does not overlap the other return timings in a predetermined number of continuous beacon frames, the start timing of power saving is adjusted so that a beacon frame with a smallest number of overlapping return timings is set to be the return timing.

6. The wireless terminal management method according to claim 1, further comprising:

associating a plurality of wireless terminals operating intermittently and at least one wireless terminal operating continuously by assigning an association ID each wireless terminal;

polling wireless terminals operating intermittently in the priority order of the association ID at the return timing of the wireless terminals; and polling the wireless terminal operating continuously after polling all of the wireless terminals operating intermittently.

7. The wireless terminal management method according to claim 1, wherein the determined power saving period is the requested power saving period.

8. The wireless terminal management method according to claim 1, wherein the determined power saving period is different from the requested power saving period.

9. A base station constituting a CSMA wireless communication system together with a wireless terminal group including a plurality of wireless terminals operable intermittently, said base station comprising:

means for collecting requested power saving periods as periods each for n beacons (where n is generally an integer of two or more), the requested power saving periods notified from each of wireless terminals operable intermittently at a time of an association, the requested power saving periods selected from among n beacons and m×n beacons (where m is an integer two or more);

means for notifying the wireless terminals of a determined power saving period determined in the base station;

means for adjusting a start timing of power saving each of the wireless terminals in order that a return timing from power save states is not overlapped in time with each other as much as possible in accordance with the determined power saving periods, the adjusting including adjusting the start timing such that there is an interval longer than at least two beacon periods between mutual generation of each return timing;

means for transiting, in accordance with the start timing of power saving adjusted by said for adjusting a start timing of power saving, wireless terminals reaching the start timing of power saving to initial power save states; and means for transiting data transmission/reception and power save state, which performs transmission/reception of data with top priority with a wireless terminal at every automatic return thereof from a power save state to transit the wireless terminal to the power save state.

10. The base station according to claim 9, wherein, upon adjusting the start timing of power saving on a newly entering wireless terminal operable intermittently at said means for adjusting a start timing of power saving, in a case where there is no beacon frame which does not overlap the other return timings in a predetermined number of continuous beacon frames, said means for adjusting a start timing power saving adjusts the start timing of power saving so that a beacon frame with a smallest number of overlapping return timings is set to be the return timing.

11. A computer readable medium including computer executable instructions, wherein the instructions, when executed by a processor, cause the processor to perform a wireless terminal management method executed in a base station constituting a CSMA wireless communication system together with a wireless terminal group including a plurality of wireless terminals operable intermittently, said method comprising:

collecting requested power saving periods as periods each for n beacons (where n is generally an integer of two or more), the requested power saving periods notified from each of wireless terminals operable intermittently at a time of an association, the requested power saving periods selected from among n beacons and m×n beacons (where m is an integer two or more);

notifying the wireless terminals of a determined power saving period determined in the base station;

adjusting a start timing of power saving of each of the wireless terminals in order that a return timing from power save states is not overlapped in time with each other as much as possible in accordance with the determined power saving periods, the adjusting including adjusting the start timing such that there is an interval longer than at least two beacon periods between mutual generation of each return timing;

transiting, in accordance with the power save start timing adjusted at said adjusting a start timing of power saving, wireless terminals reaching the start timing of power saving to initial power save states; and transiting data transmission/reception and power save state in which transmission/reception of data is performed with top priority with a wireless terminal at every automatic return thereof from a power save state to transit the wireless terminal to the power save state.

12. The computer readable medium according to claim 11, wherein, upon adjusting the start timing of power saving on a newly entering wireless terminal operable intermittently at said adjusting a start timing of power saving, in a case where there is no beacon frame which does not overlap the other return timings in a predetermined number of continuous beacon frames, the start timing of power saving is adjusted so that a beacon frame with a smallest number of overlapping return timings is set to be the return timing.

13. A base station constituting a CSMA wireless communication system together with a wireless terminal group including a plurality of wireless terminals operable intermittently, said base station comprising:

- a requested power saving period collection unit configured to collect requested power saving periods each for n beacons (where n is generally an integer of two or more), the requested power saving periods notified from each of wireless terminals operable intermittently at a time of an association, the requested power saving periods selected from among n beacons and m×n beacons (where m is an integer two or more);
- a notifying unit to notify the wireless terminals of a determined power saving period determined in the base station;
- an adjusting unit configured to adjust a start timing of power saving each of the wireless terminals in order that a return timing from power save states is not overlapped in time with each other as much as possible in accordance with the determined power saving period collected by said power saving period collection unit, the adjusting including adjusting the start timing such that there is an interval longer than at least two beacon periods between mutual generation of each return timing;
- a transition unit configured to transition wireless terminals reaching the start timing of power saving to initial power save states in accordance with the start timing of power saving adjusted by said for adjusting a start timing of power saving; and
- a data transmission/reception and power save state transition unit configured to perform transmission/reception of data with top priority with a wireless terminal at every automatic return thereof from a power save state and to transition the wireless terminal to the power save state.

14. The base station according to claim 13, wherein, upon adjusting the start timing of power saving on a newly entering wireless terminal operable intermittently at said adjusting unit is configured to adjust a start timing of power saving, in a case where there is no beacon frame which does not overlap the other return timings in a predetermined number of continuous beacon frames, and said adjusting unit is configured to adjust a start timing power saving adjusts the start timing of power saving so that a beacon frame with a smallest number of overlapping return timings is set to be the return timing.

* * * * *